INVENTOR.
PAUL SCHATZBERG

Sept. 28, 1965     P. SCHATZBERG     3,208,267
CONTAMINANT MEASUREMENT

Filed Nov. 30, 1962     2 Sheets-Sheet 2

INVENTOR.
PAUL SCHATZBERG
BY Vincent L. Carney
attorney

United States Patent Office 3,208,267
Patented Sept. 28, 1965

3,208,267
CONTAMINANT MEASUREMENT
Paul Schatzberg, Annapolis, Md., assignor to the United States of America as represented by the Secretary of the Navy
Filed Nov. 30, 1962, Ser. No. 241,451
4 Claims. (Cl. 73—61)
(Granted under Title 35, U.S. Code (1952), sec. 266)

The invention described herein may be manufactured and used by or for the Government of the United States of America for governmental purposes without the payment of any royalties thereon or therefor.

This invention relates to a method for detecting impurities and more particularly relates to a method for detecting the amount of solid contaminants in an organic liquid.

It is frequently desirable to determine the amount of solid contaminants in liquids such as fuels and hydraulic fluids. Solid contaminants, for example, may clog fuel lines and filters if they are present in liquid fuels. The amount of solid contaminants in the fuel may determine whether or not it is suitable for use, may determine its cost, or the processing that will be necessary before it is used. The presence of rust may indicate the state of corrosion of storage facilities or the need for new filters.

Estimates of the amount of solid contaminants based on visual observations of the cloudiness of the liquid are frequently too inaccurate. The analysis of the solids removed from a sample of the liquid after filtration takes much time and is not suitable for many applications. The amount of solid contaminations may change with time or there may not be sufficient time to analyse the fuel before it is required for use. Processes for measuring the amount of solid contaminants quickly are complicated and expensive.

Accordingly, it is an object of this invention to provide an improved method for measuring the amount of solid contaminants in a liquid.

It is another object of this invention to provide a simple and inexpensive method for determining the amount of solid particles in a liquid.

It is still another object of this invention to provide a method for determining quickly and inexpensively the filter plugging tendency of a jet fuel.

Figure 1:
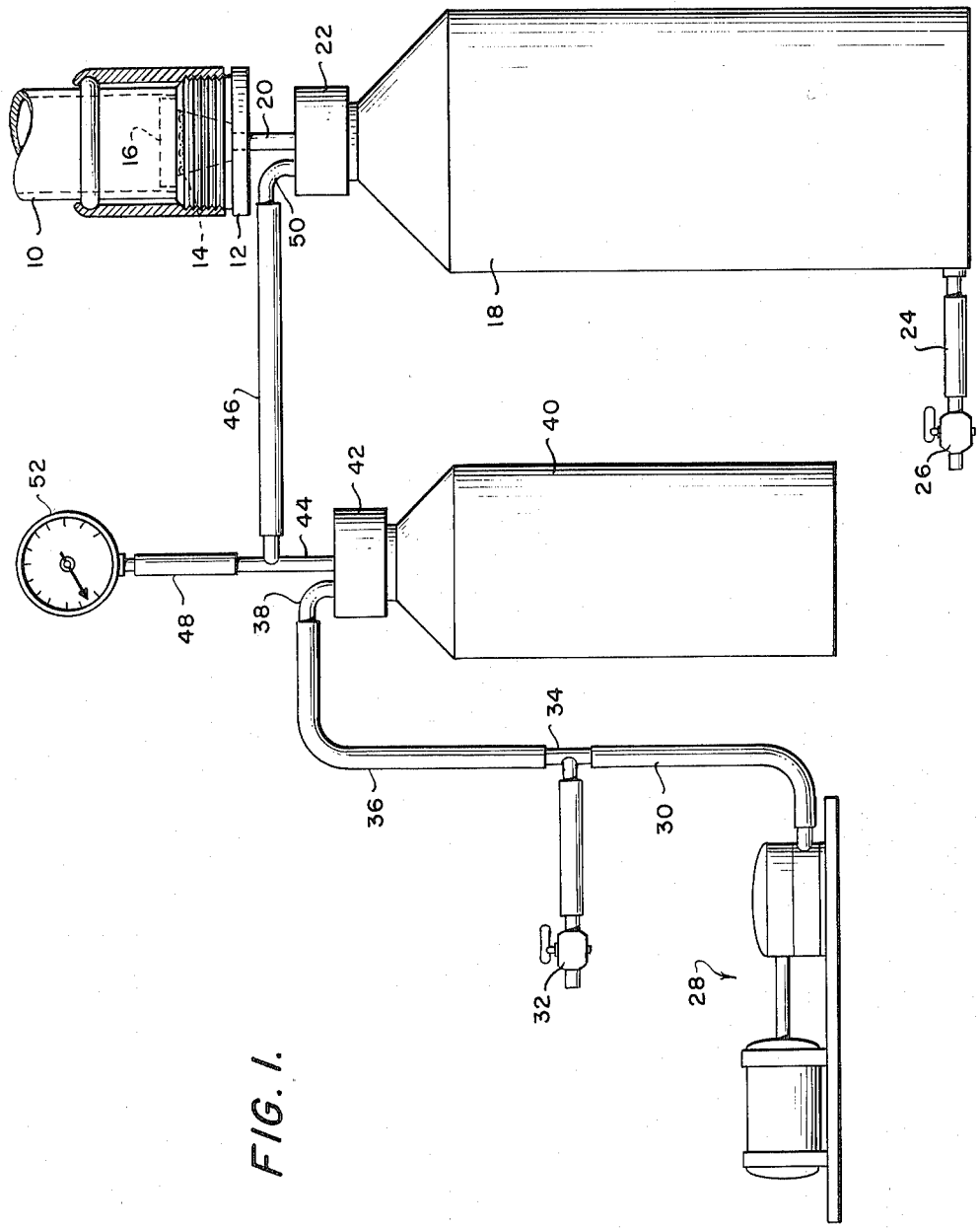
Figure 2:
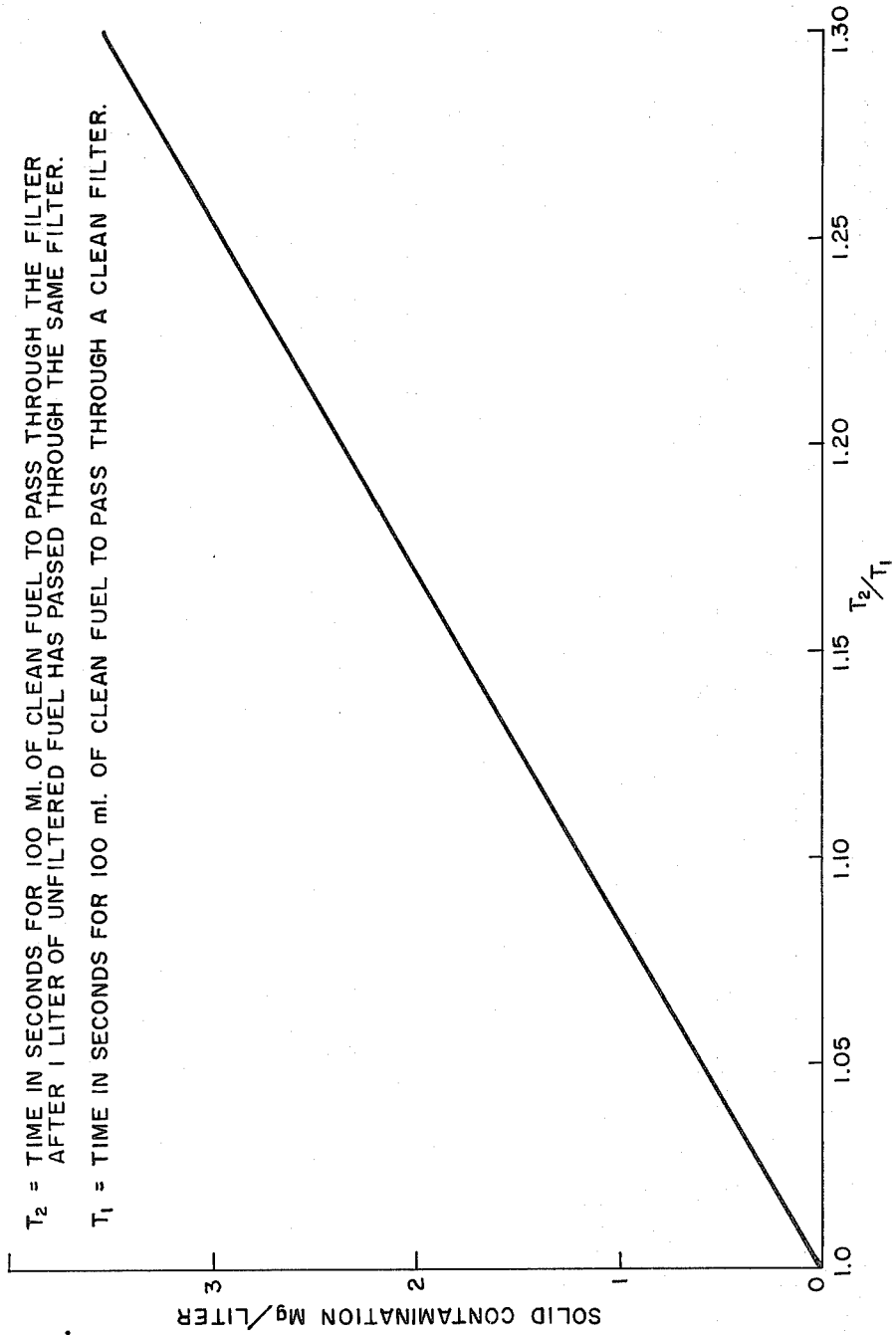

Other objects and many of the attendant advantages of this invention will be readily appreciated as the same becomes better understood by reference to the following description when considered in connection with the accompanying drawings wherein:

FIG. 1 is a diagrammatic sketch of an illustrative embodiment of this invention; and FIG. 2 is a calibration curve for a jet fuel in which the abscissae are ratios of the time required for the fuel to pass through a used filter to the time required for the fuel to pass through a clean filter and in which the ordinates represent the amount of solid contamination.

Referring in particular to FIG. 1 a diagrammatic sketch of an illustrative embodiment of the invention is shown in which a conduit 10 is coupled to the aluminum filter unit 12. The filter unit 12 has a stainless-steel support screen 14 to hold a forty seven to fifty millimeter diameter filter disk 16. These membrane filters are thin white plastic disks having 0.80 micron pore sizes.

The filter unit 12 is positioned above the two liter polyethylene bottle 18 and connected to it by aluminum tubing 20 which passes between the bottom of the filter unit 12 and the cap 22 of the polyethylene bottle so as to form a passage between the filter unit and the interior of the polyethylene bottle 18. The polyethylene bottle 18 has a waste outlet 24 in the bottom, closed by the faucet 26.

An electric vacuum pump 28 is positioned near the polyethylene bottle 18. A tube 30 connects the vacuum pump 28 to one end of the T joint of glass tubing 34. One of the two remaining ends of the T joint 34 is connected to the needle valve regulator 32 and the other end is connected to one end of the tube 36. The other end of the tube 36 is connected to one end of the glass tube 38 which is inserted into a one liter polyethylene bottle 40 through its cap 42.

One end of the glass T joint 44 is inserted into the bottle 40 through a second hole in the cap 42. One of the remaining two ends of the T joint 44 is connected to one end of the tube 46 and the other end of the T joint is connected to one end of the tube 48. A glass tube 50 has one end inserted into the polyethylene bottle 18 through a second hole in the cap 22 and the other end connected to tube 46. A vacuum gage 52 is connected to the other end of tube 48.

The equipment is assembled as described above to make measurements on fuel samples. The equipment must appear clean to a visual inspection. Samples of fuel are obtained and brought to the apparatus. These samples are taken in clean, flushed, one-liter polyethylene bottles with polyethylene screw caps. The bottles are filled to the top and capped immediately. The test should be run on these samples within one hour and before the samples have been exposed to any sudden changes in temperature.

A membrane filter disk 16 is removed from the package and placed in the filter unit 12. The vacuum pump 28 is started and the needle valve 32 is adjusted so that the vacuum gage 52 reads 100 mm. vacuum (100 mm. mercury below atmospheric pressure). A portion of the sample is poured into the conduit 10.

The first portion of the filtered fuel is used to rinse out the polyethylene bottle 18 and another storage bottle. This fuel is discarded. Then one liter of the fuel is filtered and stored in the storage bottle. This fuel must be used in the test within the day or discarded.

The old filter is discarded and a new filter is placed in the filter unit 12. This filter is thoroughly moistened with some of the filtered fuel from the storage bottle. The needle valve is adjusted, with the vacuum pump running, so that the vacuum gage reads 50 mm. The time required for 100 milliters fuel from the storage bottle to pass through the filter is measured with a stop watch to the nearest second. The stop watch is started as the fuel is poured into the conduit 10 and stopped just as the top surface of the filter disk clears of fuel.

Next, one liter of unfiltered fuel is filtered through the same filter. Then, the time required for another 100 milliliter portion of filtered fuel from the storage bottle to pass through the same filter disk is determined. This time is measured in the same manner as the first 100 milliliter portion of filtered fuel.

The ratio of the time required to filter the second portion of 100 milliliters of filtered fuel to the time required to filter the first portion of 100 milliliters of filtered fuel is proportional to the amount of solid contaminants in the unfiltered fuel that was passed through the filter between the first and second portions of filtered fuel.

A calibration curve for this proportionality is shown in FIG. 2 in which the abscissae are ratios of the time required for 100 milliliters of filtered fuel to pass through a filter containing a deposit of solid contamination to the time required for 100 milliliters of filtered fuel to pass through the same filter prior to being covered with solid contamination and in which the ordinates represent the amount of solid contamination. This chart may be used to determine the amount of solid contamination in a one liter sample of fuel from the measurements of 100 milliliter portions of filtered fuel before and after filtering the one liter of sample fuel.

The method of this invention provides a rapid and simple means for measuring the level of suspended solid contaminants in liquids. It also serves to measure the filter plugging tendency of jet fuel which is an important parameter with regard to aircraft operation. The apparatus of this invention is inexpensive and compact, occupying approximately one cubic foot and weighing approximately ten pounds.

Obviously many modifications and variation of the present invention are possible in the light of the above teachings. It is therefore to be understood that within the scope of the appended claims the invention may be practiced otherwise than as specifically described.

What is claimed is:

1. A method for measuring the amount of solid contaminants in an organic liquid, comprising the steps of:
    passing a sample of prefiltered organic liquid through a filter;
    determining the amount of time it takes for said samples of prefiltered organic liquid to pass through said filter;
    passing an unfiltered sample of said organic liquid through said filter;
    passing a second sample of said prefiltered organic liquid of the same volume as said first sample through said filter;
    determining the amount of time it takes for said second sample of prefiltered organic liquid to pass through said filter; and
    comparing the ratio of the time it took for said second sample of said prefiltered organic liquid to pass through said filter to the time it took for said first sample of prefiltered organic liquid to pass through said filter to give an indication of the amount of solid contaminants deposited on said filter from said unfiltered sample of said organic liquid.

2. A method for measuring the amount of solid contaminants in an organic liquid, comprising the steps of:
    passing a sample of said organic liquid which has had all solid contaminants removed through a filter;
    determining the amount of time it takes for said sample of organic liquid to pass through said filter;
    passing a second sample of said organic liquid of the same volume but containing normal solid contaminants through said filter;
    passing a third sample of said organic liquid of the same volume and with all solid contaminants removed through the same filter;
    determining the amount of time it takes for said third sample of organic liquid to pass through the same filter; and
    comparing the ratio of the time it took for said third sample of said organic liquid to pass through said filter to the time it took for said first sample of organic liquid to pass through said filter to give an indication of the amount of solid contaminants deposited on said filter by passing said second sample of said organic liquid through said filter.

3. A method of measuring the amount of solid contaminants in a sample of liquid fuel, comprising the steps of:
    a depositing 100 milliliters of clean liquid fuel in a 0.80 micron pore size filter;
    drawing said clean liquid fuel through said filter under a constant vacuum of 50 millimeters of mercury;
    timing said flow of clean liquid fuel through said filter said to the nearest second;
    depositing liter of said sample of liquid fuel in said filter;
    drawing said liter sample of liquid fuel through said filter whereby the solid contaminants in said liquid fuel will be deposited on said filter;
    depositing a second 100 millimeters of clean liquid fuel in said filter;
    drawing said second 100 milliliters of clean liquid fuel through said filter under a constant vacuum of 50 millimeters of mercury;
    timing said flow of said second 100 millileters of clean liquid fuel through said filter to the nearest second; and
    comparing the time it took for said first 100 milliliters of clean liquid fuel to flow through said filter with the time it took for said second 100 milliliters of clean liquid fuel to flow through said filter.

4. A method of measuring the amount of solid contaminants in a sample of liquid fuel, comprising the steps of:
    depositing a first predetermined volume of prefiltered liquid fuel on a filter;
    drawing said prefiltered liquid fuel through said filter under a constant vacuum;
    timing the flow of prefiltered liquid fuel through said filter;
    depositing a predetermined volume of unfiltered sample liquid fuel on said filter;
    drawing said predetermined volume of unfiltered fuel through said filter whereby the solid contaminants in said liquid fuel will be deposited on said filter;
    depositing a second volume, equal to said first predetermined volume, of prefiltered liquid fuel on said filter;
    drawing said second volume of fuel through said filter under a constant vacuum equal to the vacuum at which said first predetermined volume of prefiltered fuel was drawn through said filter;
    timing the flow of said second volume of prefiltered fuel through said filter; and
    comparing the ratio of the time it took for said second volume of prefiltered fuel to flow through said filter to the time it took for said first volume of prefiltered fuel to pass through said filter to give an indication of the amount of solid contaminants deposited on said filter by said volume of unfiltered sample fuel.

References Cited by the Examiner

UNITED STATES PATENTS

| | | | |
|---|---|---|---|
| 2,638,688 | 5/53 | Hazelton | 73—38 X |
| 2,751,779 | 6/56 | Hodson et al. | 73—38 |
| 3,034,336 | 5/62 | Upshur | 73—38 |
| 3,063,289 | 11/62 | Moul | 73—61 |
| 3,085,425 | 4/63 | Roman | 73—61 |

LOUIS R. PRINCE, *Primary Examiner.*

DAVID SCHONBERG, RICHARD QUEISSER,
*Examiners.*